US009026098B2

(12) United States Patent
Naftolin

(10) Patent No.: US 9,026,098 B2
(45) Date of Patent: May 5, 2015

(54) TRANSFER OF STATUS INFORMATION CONCERNING A MOBILE DEVICE VIA A CLOUD BASED SERVICE

(75) Inventor: Jordan Naftolin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/220,742

(22) Filed: Aug. 30, 2011

(65) Prior Publication Data

US 2013/0052991 A1 Feb. 28, 2013

(51) Int. Cl.
*H04M 3/00* (2006.01)
*H04W 8/22* (2009.01)
*H04W 24/10* (2009.01)

(52) U.S. Cl.
CPC ............. *H04W 8/22* (2013.01); *H04W 24/10* (2013.01)

(58) Field of Classification Search
CPC ..... H04W 24/00; H04W 24/02; H04W 24/04; H04W 8/22
USPC .......................... 455/418, 419, 423, 424, 425
See application file for complete search history.

(56) References Cited

U.S. PATENT DOCUMENTS

| | | | |
|---|---|---|---|
| 7,873,382 B2 | 1/2011 | Rydgren et al. | |
| 8,135,395 B2 * | 3/2012 | Cassett et al. | 455/423 |
| 2003/0162534 A1 * | 8/2003 | Lee | 455/420 |
| 2006/0097885 A1 * | 5/2006 | Sengupta et al. | 340/636.1 |
| 2007/0123287 A1 * | 5/2007 | Mock et al. | 455/518 |
| 2007/0190956 A1 * | 8/2007 | Chen et al. | 455/230 |
| 2007/0190995 A1 * | 8/2007 | Wang et al. | 455/419 |
| 2009/0232127 A1 | 9/2009 | Jaiswal et al. | |
| 2010/0279673 A1 | 11/2010 | Sharp et al. | |

OTHER PUBLICATIONS

"Impatica viaDock", Retrieved at <<http://www.impatica.com/products/viadock/index.html>>, Retrieved Date: Mar. 14, 2011, pp. 3.
"Remotely Control Android Phone", Retrieved at <<http://www.taranfx.com/remotely-control-android-phone-vnc-server>>, Jul. 24, 2010, pp. 9.
"BoxTone User Self-Service Module: Empower End Users to Resolve Their Own Mobile Issues with Mobile USS", Retrieved at <<http://www.boxtone.com/Products/Modules/USSPortalExpert.aspx>>, Retrieved Date: Mar. 14, 2011, pp. 2.

(Continued)

*Primary Examiner* — Vladimir Magloire
*Assistant Examiner* — Shantell L Heiber
(74) *Attorney, Agent, or Firm* — Kate Drakos; Micky Minhas

(57) ABSTRACT

A method and system allows a mobile device user to receive status information concerning the mobile device even when the user is not in possession of the mobile device. The user can access the status information via a cloud-based service, thereby allowing the user to be made aware of the device's status from any location at which the user has network (e.g., Internet) access. The system includes the service, which securely receives and stores the status information from the mobile device and a client, which is used to access the service in order to receive the status information to display to the user, and which can send commands to the mobile device.

18 Claims, 4 Drawing Sheets

(56) References Cited

OTHER PUBLICATIONS

"SpyBubble—Monitor Any Mobile Phone From Your PC Without Being Noticed", Retrieved at <<http://helpmegetoutofdebt.net/weblog/spybubble-monitor-any-mobile-phone-from-your-pc-without-being-noticed-1298.html>>, Retrieved Date: Mar. 14, 2011, pp. 3.

"Mobiola® Remote Phone Control", Retrieved at <<http://www.warelex.com/products/remotecontrol/>>, Retrieved Date: Mar. 14, 2011, p. 1.

Author Unknown, Impatica Viadock, "Use your Blackberry Through Your Computer", www.impatica.com, 2011, 2 pages.

* cited by examiner

TRANSFER OF STATUS INFORMATION CONCERNING A MOBILE DEVICE VIA A CLOUD BASED SERVICE

BACKGROUND

Mobile devices have been adapted to a wide variety of applications, including computing, communication, and entertainment. For example, mobile telephones permit users to freely initiate and receive voice communications. Similarly, mobile media devices have been developed to permit users to take electronic entertainment, including audio, video, and electronic games, to even the most remote location. Further, mobile computing devices have been developed to provide users with remote access to data communications through wireless connectivity, such as over IEEE 802.11 or 3G networks. Some mobile devices, such as smart phones, support a combination of voice communications, entertainment, and mobile computing.

Systems have been developed, which allow users of mobile devices to remotely control their mobile devices from a computer or other device. These systems allow access to various applications residing on the mobile device so that the user can, for example, turn on and off various features and functions of the mobile device, navigate through menus available on the device, and so on.

SUMMARY

A method and system is provided which allows a mobile device user to receive status information concerning the mobile device even when the user is not in possession of the mobile device. The user can access the status information via a cloud-based service, thereby allowing the user to be made aware of the device's status from any location at which the user has network (e.g., Internet) access. The system includes the service, which securely receives and stores the status information from the mobile device and a client, which is used to access the service in order to receive the status information and send commands to the mobile device.

In some implementations the status information that is provided to the user may include, for instance, any information concerning the occurrence of an event (e.g., an incoming call or text message, a missed call, receipt of unheard voicemail messages) or the current state of the mobile device (e.g., battery level, signal strength). The system allows a user to know when the device enters a particularly significant or critical state, such as when the device's currently remaining battery life is running low or when the device's signal strength is weak, for instance, even if the phone is inaccessible to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Information concerning the status of a mobile device may be useful in a variety of different circumstances. For instance, in one common situation, the user may be at home but in a different room from the mobile device. In addition, there are often actions that the user would like to perform on the mobile device, such as ignoring an incoming call, receiving notification of an incoming voice message, and so on, which can be difficult to perform if the device is in the user's pocket or in another room.

Further illustrative examples of common situations in which the system may be useful arise in the context of a work environment. For instance, a user may be at work with their mobile device in their pocket when it starts to ring. They are busy working on their computer and would like to know who is calling to decide whether to answer the call. More than likely, they will simply want to send the caller to voicemail unless it is from someone very important. This caller information can be provided to them directly on their computer screen, and if desired, the user can choose to send the call to voicemail from their computer, without needing to take the mobile device term his or her pocket.

In another example, a user who is at work with their mobile device in their pocket may be expecting an important call, but is unaware that the mobile device has no signal strength or is low on battery power, which would prevent them from receiving the call. This status information can be presented to them on another device such as their desktop PC, for instance. Moreover, the PC may notify the user if a low battery or low signal strength condition occurs.

In yet another example, a user is at home watching tv in the basement while their mobile device is charging in a bedroom upstairs. The user cannot hear when the device rings or provides an alert indicating that a text message has been received. This status information can be provided to the user on the television and/or other devices (e.g. a tablet) that may be readily accessible to the user while in the basement. One advantage arising from making the status information available on multiple devices at the same time is that the information can in effect travel with the user since, for instance, devices located in the kitchen and the basement can be used to obtain the status information.

Figure 1:
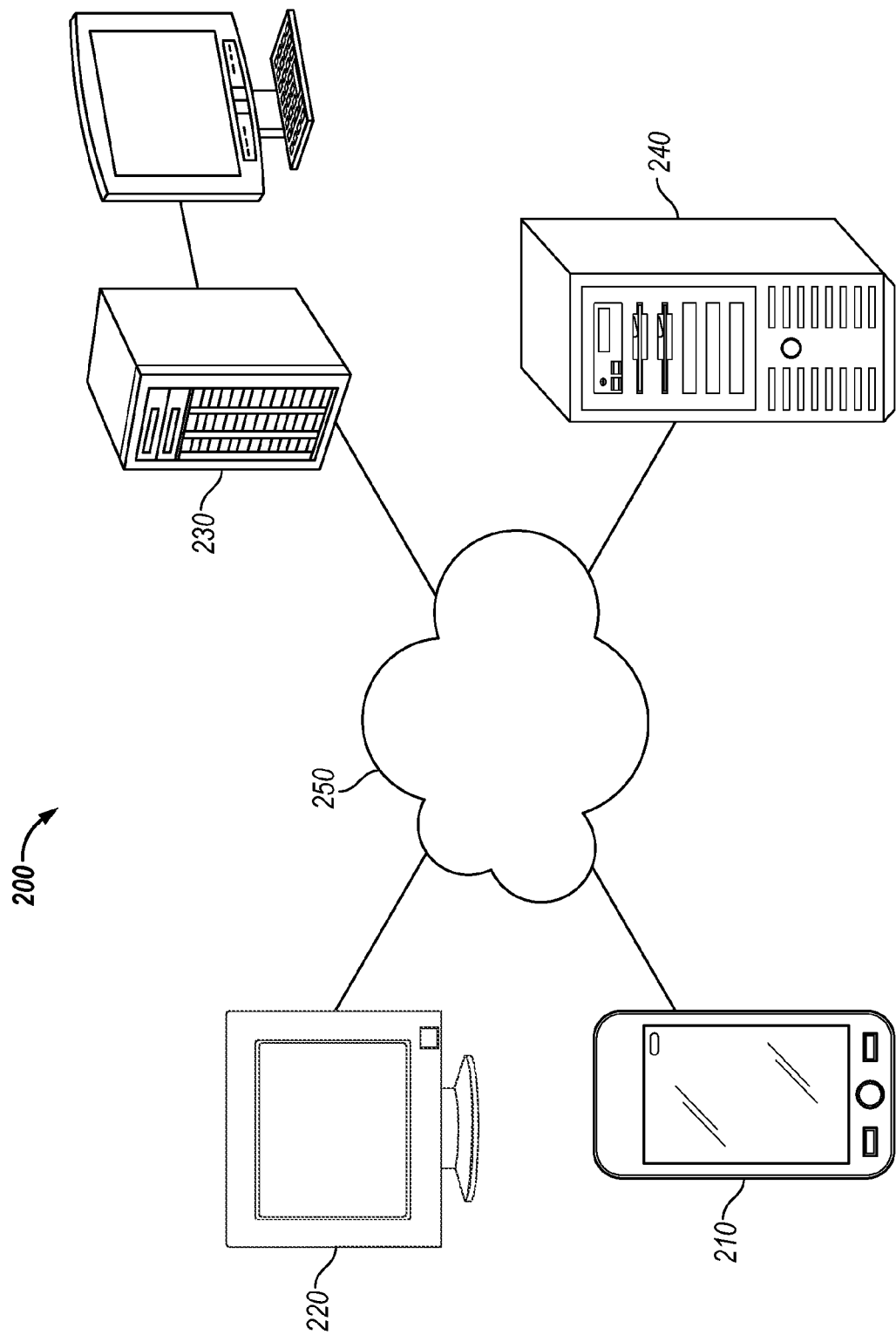
FIG. 1 shows an exemplary computing environment that includes a mobile device, a status notification system and client devices.

FIG. 1 shows an exemplary computing environment 200 that includes a mobile device 210, a status notification system 240 and client devices 220 and 230. A communication network 250 connects the devices and applications hosted in the computing environment 200. The communication network 250 can be any type of network, including a local area network ("LAN"), such as an intranet, and oxide area network ("WAN"), such as the internet. Further, the communication network 250 can be a public network, a private network, or a combination thereof. The communication network 250 also can be implemented using any type or types of physical media, including wired communication paths and wireless communication paths associated with multiple service providers. Additionally, the communication network 250 can be configured to support the transmission of messages formatted using a variety of protocols.

Status notification system 240 may be implemented by one or more computing devices arranged to provide the functionality described herein. For example, the status notification system 240 may be implemented by multiple server machines. In some implementations the status notification system 240 may be implemented as a cloud service.

Client devices 220 and 230 may be any network-enabled device that can communicate with the status notification system 240 over communication network 250. For example, client devices 220 and 230 may be, without limitation, a PC, laptop, netbook, tablet, television, gaming device, landline or wireless telephone, smart phone, media device, alarm clock, kitchen appliance or other dedicated appliance.

In some examples the mobile device 210 is a mobile communications device such as a wireless telephone that also contains other functions, such as PDA and/or music player functions. To that end the device may support any of a variety of applications, such as a telephone application, a video conferencing application, an e-mail application, an instant messaging application, a blogging application, a digital camera application, a digital video camera application, a web browsing application, a digital music player application, and/or a digital video player application. In some implementations the mobile device 210 may correspond to a mobile device of the type that will be described below in connection with FIG. 2.

Figure 2:
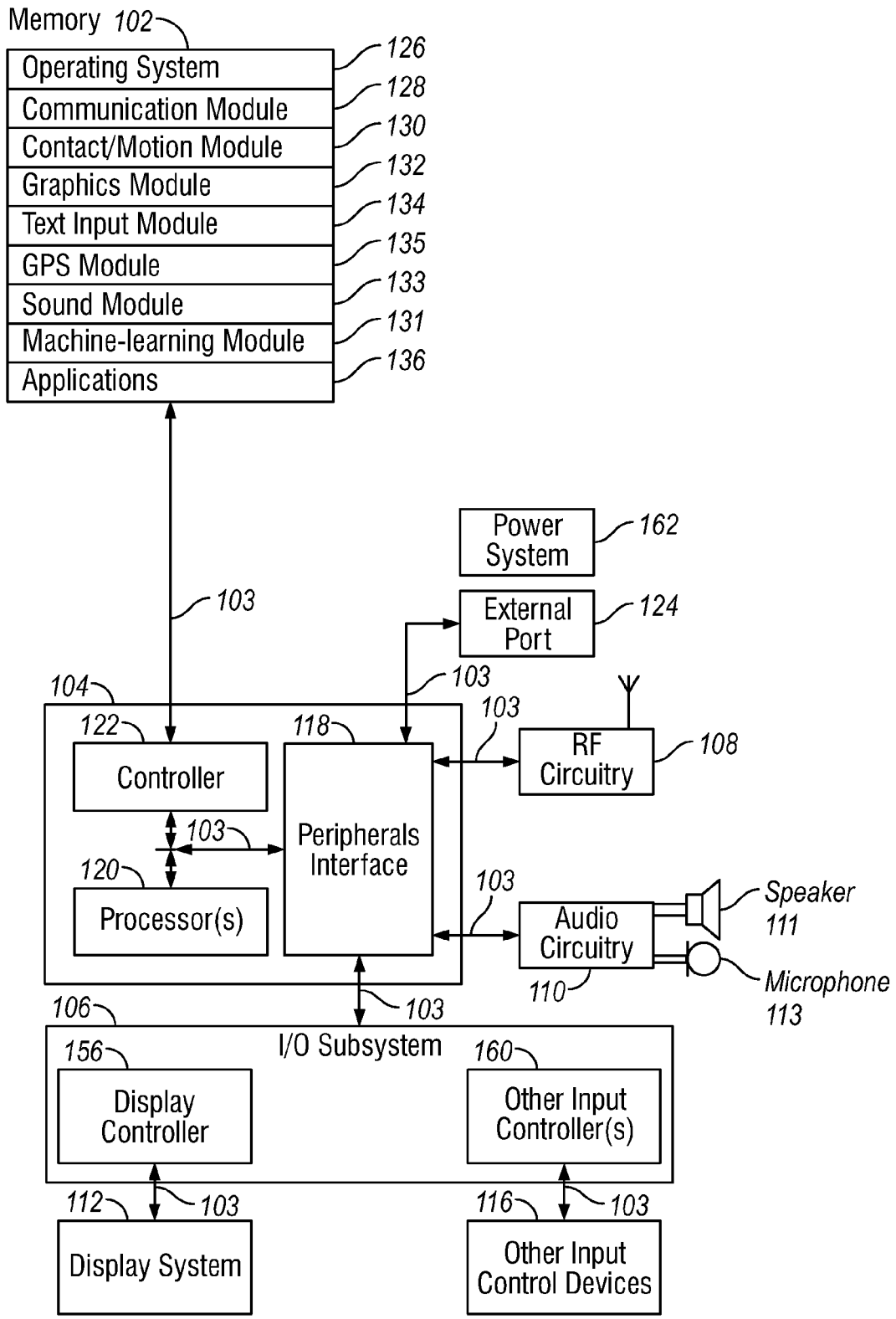
FIG. 2 shows one example of a mobile device.

The mobile device 100 in FIG. 2 includes a memory unit 102 (which may include one or more computer readable storage media), a memory controller 122, one or more processors (CPU's) 120, a peripherals interface 118, RF circuitry 108, audio circuitry 110, a speaker 111, a microphone 113, display system 103, an input/output (I/O) subsystem 106, other input or control devices 116, and an external port 124. These components may communicate over one or more communication buses or signal lines 103. Along with the input or control devices 116, the speaker 111, microphone 113 and display system 103 form a user interface through which a user can enter and receive various types of information and can communicate with other individuals over communication networks using RF circuitry 108.

It should be appreciated that the device 100 is only one example of a mobile communications device 100 and that the device 100 may have more or fewer components than shown, may combine two or more components, or a may have a different configuration or arrangement of components. The various components shown in FIG. 2 may be implemented in hardware, software or a combination of both hardware and software, including one or more signal processing and/or application specific integrated circuits.

Memory unit 102 may include high-speed random access memory and non-volatile memory, such as one or more magnetic disk storage devices, flash memory devices, or other non-volatile solid-state memory devices. Access to memory unit 102 by other components of the device 100, such as the CPU 120 and the peripherals interface 118, may be controlled by the memory controller 122. The peripherals interface 118 couples the input and output peripherals of the device to the CPU 120 and memory unit 102. The one or more processors 120 run or execute various software programs and/or sets of instructions stored in memory unit 102 to perform various functions for the device 100 and to process data. In some examples the peripherals interface 118, the CPU 120, and the memory controller 122 may be implemented on a single chip, such as a chip 104. In other examples they may be implemented on separate chips.

The RF (radio frequency) circuitry 108 includes a receiver and transmitter (e.g., a transceiver) for respectively receiving and sending RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 form a part of the user interface provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 front audible signals (i.e., sound waves). The speaker 111 and microphone 113 are two examples of audio transducers that may be employed in the mobile communications device. The audio circuitry 110 converts the electrical signal to audio data and transmits the audio data to the peripherals interface 118 for processing. Audio data may be retrieved from and/or transmitted to memory unit 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the display screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some examples input controller(s) 160 may be coupled to any (or none) of the following: a keyboard, infrared port, USB port, and a pointer device such as a mouse.

The display screen 112 provides an input interface and an output interface between the device and a user. The display controller 156 receives and/or sends electrical signals from/to the display screen 112. The display screen 112 displays visual output to the user. The visual output may include graphics, text, icons, video, and any combination thereof (collectively termed 'graphics').

The display screen 112 will generally include a suitable display such as an OLED display, PLED display, active matrix liquid crystal display, passive matrix liquid crystal display, electrophoretic display, cholesteric liquid crystal display, polymer dispersed liquid crystal and nematic liquid crystal display. In some implementations the display screen 112 may be a touch-screen display.

The device 100 also includes a power system 162 for powering the various components. The power system 162 may include a portable power supply (e.g., battery) and components necessary to receive power from an alternating current (AC) source, a power management system, a recharging system, a power failure detection circuit, a power converter or inverter and any other components associated with the generation, management and distribution of power in portable devices.

In some embodiments, the software components stored in memory unit 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, a sound module 133 (or set of instructions) and applications (or set of instructions) 136.

The operating system 126 (e.g., Darwin, RTXC, LINUX, UNIX, OS X, Microsoft WINDOWS®, Android or an embedded operating system such as VxWorks) includes various software components and/or drivers for controlling and managing general system tasks (e.g., memory management, storage device control, power management, etc.) and facilitates communication between various hardware and software components. The communication module 128 facilitates communication with other devices over one or more external ports 124 and also includes various software components for handling data received by the RF circuitry 108 and/or the external port 124 (e.g., Universal Serial Bus (USB), FIREWIRE etc.).

The graphics module 132 includes various known software components for rendering and displaying graphics on the display screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., applications that provide location-based services such as weather widgets, local yellow page widgets, and map/navigation widgets).

The applications 136 may include any combination of the following illustrative modules: a contacts module, a telephone module; a video conferencing module; an e-mail client module an instant messaging (IM) module; a blogging module; a camera module; an image management module; a video player module; a music player module; a browser module; a word processing module; a voice recognition module; a calendar module; widget modules, which may include a weather widget, stocks widget, calculator widget, alarm clock widget, dictionary widget, and other widgets obtained by the user, as well as user-created widgets.

In one implementation, applications 136 may include a status application that monitors the status of the mobile device, collects the status information and coordinates its communication to the status notification system. Other functions and features offered by the status application will be discussed below.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory unit 102 may store a subset of the modules and data structures identified above. Furthermore, memory unit 102 may store additional modules and data structures not described above.

As previously mentioned, the status notification system 240 allows a user to receive status information concerning the mobile device 210 on a client device 220. The status information sent by the mobile device 220 may be any information such as the occurrence of an event or the current state of the mobile device. The information that is to be sent to the status information system 240 and retrieved by the client may be specified by the user or may be a default set of information determined by the system 240.

In some implementations the mobile device will only communicate the status information to the status notification system under certain circumstances. These circumstances may be selected in order to meet various criteria. For instance, it generally will be important to the user to conserve the battery power of the mobile device and reduce data communication fees. Accordingly, the user may wish to be prudent when determining how often status information should be sent by the mobile device. In addition to the user's preferences, the system operator may wish to limit costs associated with delivering the service, providing a further incentive to carefully determine when the status information is to be communicated to the system and forwarded to the client.

Illustrative circumstances that may trigger or otherwise cause the mobile device to provide the status notification system with status information may include any of the following:

When the mobile device boots up.

When the mobile device receives an incoming phone call. In this case, the mobile device will inform the status notification system that the mobile device is ringing, and may send caller information such as the incoming phone number and caller name, if available from, e.g., the address book in the mobile device.

Upon a change in the number of missed calls, incoming chat requests, text messages, or voicemail messages.

If and when the battery level crosses a threshold level (e.g. critical, low medium, high), which may be established by default or by the user.

If and when the signal strength crosses a threshold level (e.g. no signal, low, medium, high), which may be established by default or by the user.

In addition to the above, the mobile device may send status information to the status notification system on a periodic basis. This is to ensure reliability in case the system missed an earlier status update. The time interval may be dependent on several factors, including, for example, the AC power status (i.e., whether or not an external AC power source is being used to power the device) current battery level, current network connection type (e.g. Wi-Fi vs a cellular network data connection), recent mobile device activity level, and so on. For example, if the mobile device is connected to an AC power source and is connected to a Wi-Fi network and has recently been in use, then under this set of circumstances the mobile device may contact the status notification system more frequently. On the other hand, if the mobile device is not connected to AC power, is low on battery power, has network connectivity via the cellular network, and has not been used recently, then it may contact the status notification system less frequently.

The status information that is sent to the status notification system generally includes the mobile device's phone number or other identifier. The status notification system maintains a database that includes the status information of the mobile devices. A client can obtain a mobile phone's most recent status via an application programming interface that the notification service provides, such as a web service. The status information for any particular mobile device can be accessed using its phone number or other identifier. Clients can obtain the most recent status information for a mobile device through a user interface such as a web site provided by the system notification system using a web browser that resides on the client. The notification system may also require the user to enter a passcode along with the identifier of the mobile device for added security.

Figure 3:
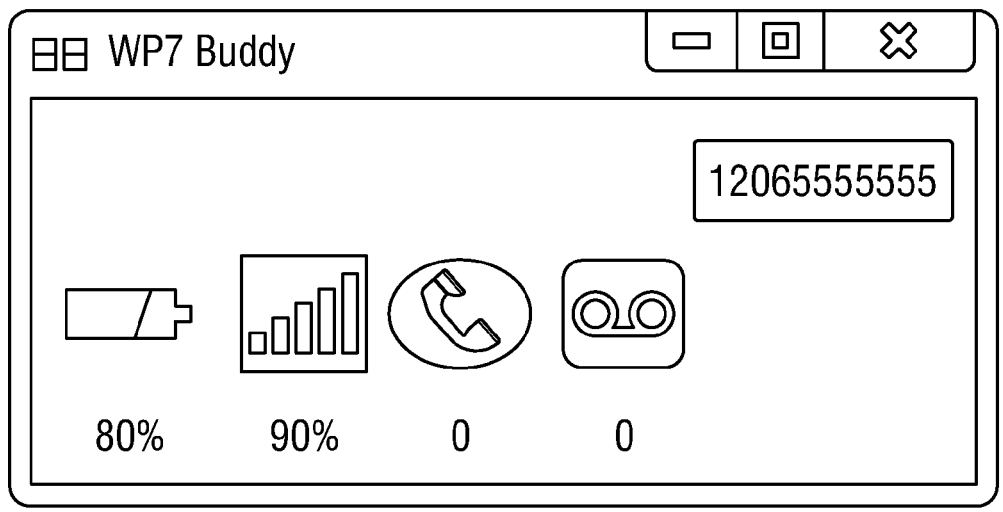
FIG. 3 shows one example of a status screen that may be presented by the status notification system on a display of the client device.

FIG. 3 shows one example of a status screen 10 that may be presented by the status notification system on a display of the client. In some implementations the status screen 10 may be automatically presented on the display as an overlay or pop-up upon being received by the client. In other implementations the status screen 10 may only be presented on the client display when the user accesses the status notification system, e.g., through a web browser, or when the user opens an application residing on the client. As shown, in this example the status screen indicates that the battery level is at 80%, the signal strength is at 90%, and that there have been no missed calls or voicemail messages for the telephone number 1-206-555-5555. Of course, this information included in this screen will vary depending on the status information that is to be reported by the mobile device.

Figure 4:
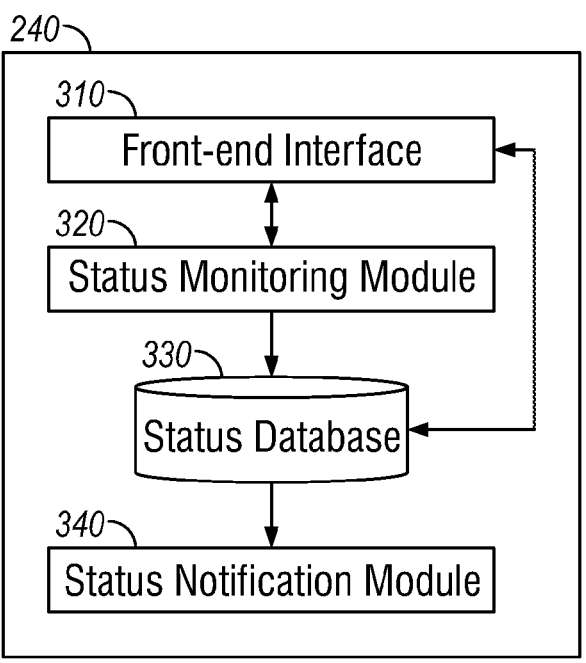
FIG. 4 shows one example of a status notification system.

The status notification system 240 shown in FIG. 1 typically includes one or more physical server computers with one or more physical storage devices and databases as well as various processing engines. In one particular implementation, shown in FIG. 4, the status notification system 240 includes one or more modules or components 130 that reside on application servers which execute one or more applications. In FIG. 4 four logical components or modules are shown: front-end interface 310, status monitoring module 320, status database 330 and status notification program 340.

Front-end interface 310 provides an access portal that can be accessed by a client-based application such as a conventional web browser through which a user can log into the system, identify his or her mobile device using a device identifier (e.g., phone number), and access current and possibly past status information concerning the mobile device. The user may also be able to set or change various settings associated with his or her account such as the particular information to be included in the status report to be received, the client(s) which are to receive the status report, the manner in which the status information is to be displayed on the client(s) and so on. The user may also be able to activate and deactivate the status notification system through the front-end interface 310.

The status monitoring module 320 communicates with the various mobile devices registered with the status notification system. In particular, the status monitoring module 320 receives the status information from the mobile device and sends commands to the mobile device. The status database 330 maintains the status information received from the mobile device, which is associated with the mobile device identifier so that it can be located. The status notification module 340 communicates with the various clients who have been registered under the account associated with each mobile device. In general, the client logs on or otherwise accesses the status notification system 240 to obtain the status information from the status notification module 340 concerning one or more mobile devices associated with the user's account. That is, the status notification system 240 operates in accordance with a pull model, in which the client pulls data from the notification system 240. In another implementation, however a push model may be employed in which the status notification module 340 sends the status information and any other messages via a network address (e.g., a URL) which has been provided for each client as part of the user's account information.

In some cases a client can send commands via the status notification system 240 to control the mobile device. For instance, the client can send a request to the status notification system instructing the mobile device to, say, ignore an incoming call. The status notification system, in turn, can send a message to the mobile device instructing it to respond to incoming calls in accordance with the client's instructions. The status notification system may store these instructions in the status monitoring module 320 so that they can be provided to the mobile device at the appropriate time(s).

In comparison to systems which allow a mobile device to communicate with a particular PC over a Bluetooth or similar connection, the system described herein offers a number of advantages. For instance, the mobile device is not proximity bound since it does not need to be within range of the client. In addition, multiple client devices in various locations can receive status information concerning a mobile device at the same time, and the connection process that allows the client devices to obtain this information is straightforward. Moreover, the hardware/software that is used is not dependent on the specific transfer technology (e.g. Bluetooth) since it may simply rely on a connection to the Internet.

Figure 5:
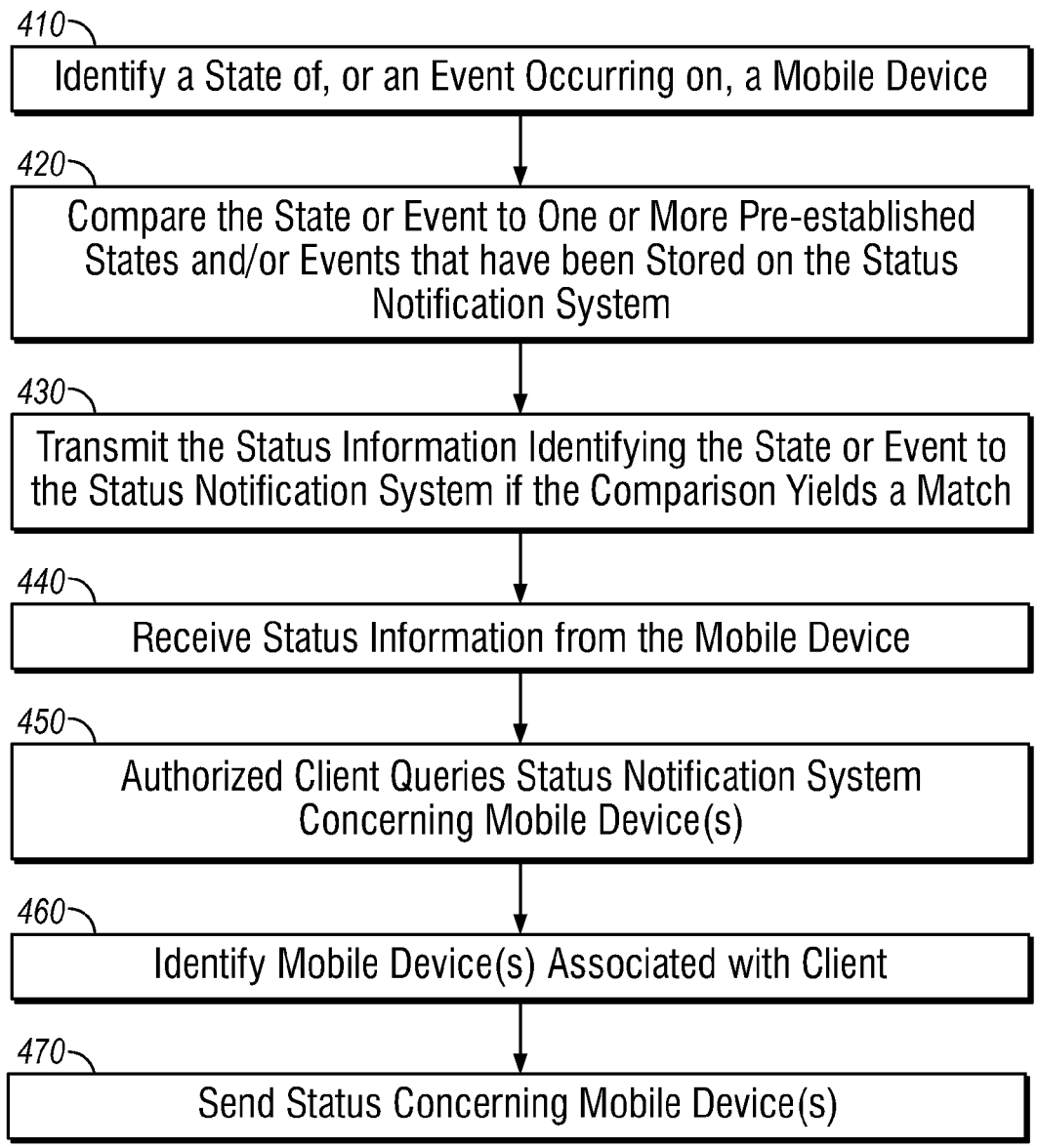
FIG. 5 is a flowchart showing one example of a method for providing status information concerning a mobile device to a client via a status notification system.

FIG. 5 is a flowchart showing one example of a method for providing status information concerning a mobile device to a client via a status notification system. The method begins at step 410 when the status application, module or other component(s) residing on the mobile device identifies a gate of, or an event occurring on, a mobile device. The status application, module or other component(s) at step 420 then compares the state or event to one or more pre-established states and/or events. These pre-established states and/or events may have been previously selected and entered into the mobile device by the user or they may have been established by default. Next, if the state or event that has been identified matches at least one of the pre-established conditions or events, then at step 430 the status application, module or other component(s) transmits the status information identifying the state or event to the status notification system over a communication network such as the Internet or the like.

The status notification system receives the status information from the mobile device at step 440. At some later time an authorized client queries the status notification system at 450 over a communication network. In some implementations the client may be authorized by entering a passcode or other identifier. The query may specify the particular mobile device for which information is being requested (using e.g., a mobile device identifier such as a phone number). Alternatively, the status notification system may identify at step 460 one or more mobile devices that are associated with the authorized client's account. Once the mobile device or devices are identified, the status notification system sends the status information to the client over the communication network at step 470.

In some implementations, if more than one mobile device is associated with a client account and the client has not already specified a particular mobile device, the system may first present a list of such devices to the client and request the client to select the mobile device or devices for which status information is desired. Alternatively, the system may simply present the status information for all the mobile devices associated with the client account.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive). Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of providing status information concerning a mobile device to a client via a status notification system, comprising:
    identifying a state of, or an event occurring on, a mobile device;
    at the mobile device, comparing the state or event to one or more pre-established states and/or events that are to be communicated to a service associated with a status notification system that makes status information concerning the mobile device available to authorized clients;
    transmitting, on a periodic basis, from the mobile device, to the status notification system, over a communication network, status information identifying the state or event when the state or event matches at least one of the pre-established conditions or events,
    wherein a frequency upon which the status information is transmitted to the status notification system is determined at least in part on whether AC power is being supplied to the mobile device, a level of battery power remaining in the mobile device, a current type of network connectivity being used by the mobile device, wherein the type of network connectivity indicates a type of data connection in which the mobile device communicates with the communication network, and a recent activity level of the mobile device; and
    wherein a frequency upon which the status information is transmitted to the status notification system is greater if the mobile device is connected to an AC power source than if the mobile device is not connected to an AC power source.

2. The method of claim 1 in which the pre-established event is an incoming phone call or text message.

3. The method of claim 1 in which the pre-established state includes a level of battery power remaining in the mobile device that has passed a threshold level.

4. The method of claim 1 in which the pre-established state includes a network connectivity signal strength that has passed a threshold level.

5. The method of claim 1 in which the pre-established event includes a change in a number of missed calls, incoming chat requests, or voicemail messages.

6. The method of claim 1 in which a state of the mobile device included in the status information is a transition from an off to an on state when the mobile device boots up.

7. The method of claim 1 wherein (a) if AC power is being supplied to the mobile device, (b) if a level of battery power remaining in the mobile device is above a threshold level, (c) if a current type of network connectivity being used by the mobile device has a signal strength that is above a threshold level, or (d) if a recent mobile device activity level is above a threshold level, then status information is transmitted to the status notification system at a higher frequency than if none of conditions (a)-(d) are met.

8. The method of claim 1 in which the type of network connectivity comprises a cellular network data connection.

9. The method of claim 1 in which the type of network connectivity comprises wi-fi.

10. A mobile device, comprising:
    a transmitter and receiver for respectively sending and receiving RF signals;
    at least one memory unit storing a plurality of pre-established states of, or events occurring on, the mobile device;
    a display screen;
    a user interface for receiving user input;
    a status notification component for: (i) identifying a state of, or an event occurring on, a mobile device; (ii) comparing the state or event to the plurality of pre-established states and/or events stored in the memory unit; and (iii) causing the transmitter to transmit, from the mobile device, to a status notification system, over a communication network status information identifying the condition or event when the condition or event matches at least one of the pre-established conditions or events;
    a processor operatively associated with the transmitter, receiver, memory unit, display screen, user interface and status notification component;
    wherein the status notification component is further configured to cause the transmitter to transmit to the status notification system status information identifying the condition or event on a periodic basis, wherein a frequency upon which the status information is transmitted to the status notification system is determined at least in part on whether AC power is being supplied to the mobile device, a level of battery power remaining in the mobile device, a current type of network connectivity being used by the mobile device, wherein the type of network connectivity indicates a type of data connection in which the mobile device communicates with the communication network, and a recent mobile device activity level; and wherein a frequency upon which the status information is transmitted to the status notification system is greater if the mobile device is connected to an AC power source than if the mobile device is not connected to an AC power source.

11. The mobile device of claim 10 in which the pre-established event is an incoming phone call or text message.

12. The mobile device of claim 10 in which the pre-established state includes a level of battery power remaining in the mobile device has passed a threshold level.

13. The mobile device of claim 10 in which the pre-established state includes a network connectivity signal strength that has passed a threshold level.

14. The mobile device of claim 10 in which the pre-established event includes a change in a number of missed calls, incoming chat requests, or voicemail messages.

15. The mobile device of claim 10 in which a state of the mobile device included in the status information is a transition from an off to an on state when the mobile device boots up.

16. The mobile device of claim 10 in which the status notification component is activatable and deactivatable upon user request.

17. The mobile device of claim 10 in which the type of network connectivity comprises a cellular network data connection.

18. The mobile device of claim 10 in which the type of network connectivity comprises wi-fi.

* * * * *